July 13, 1926.
V. CHANCELLOR ET AL
COMBINED SEPARATOR AND TRAP DEVICE
Filed Dec. 17, 1925
1,592,079
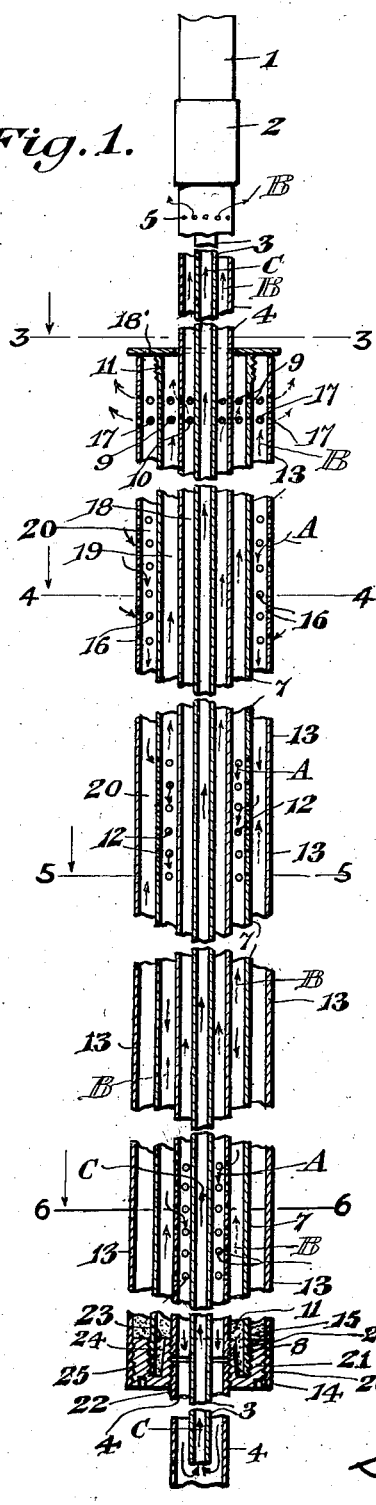
INVENTORS
Victor Chancellor
Sebastian L. Calvert,
BY
Geo. P. Kimmel ATTORNEY.

Patented July 13, 1926.

1,592,079

UNITED STATES PATENT OFFICE.

VICTOR CHANCELLOR AND SEBASTIAN L. CALVERT, OF BRISTOW, OKLAHOMA.

COMBINED SEPARATOR AND TRAP DEVICE.

Application filed December 17, 1925. Serial No. 76,065.

This invention relates to a combined separator and trap device for use in connection with oil and gas well pumps, and has for its object to provide, in a manner as hereinafter set forth, a device of the class referred to, for efficiently separating the gas from the oil when pumping oil and gas wells and further for trapping the sand simultaneously with the separation of the gas from the oil to prevent the sand interfering with the operation of the pump.

Further objects of the invention are to provide, in a manner as hereinafter set forth, a combined separator and trap device for the purpose referred to, which is simple in its construction and arrangement, strong, durable, compact, thoroughly efficient in its use, conveniently installed with respect to the working barrel, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a fragmentary view, in longitudinal section, of a combined separator and trap device, in accordance with this invention.

Figure 2 is a side elevation of the device.

Figures 3, 4, 5 and 6 are respectively sections taken on the lines 3—3, 4—4, 5—5 and 6—6, Figure 1.

A combined separator and trap device, in accordance with this invention, is connected to the bottom of the standing valve or lower valve in the working or pumping barrel 1 by a coupling sleeve 2, and the said device comprises an oil conducting tube 3 of substantial length and which opens into the barrel 1 through the standing or lower valve, not shown. The tube 3 is connected in any suitable manner at its upper end with the working barrel 1 and is of appropriate diameter. Surrounding the tube 3, as well as spaced therefrom, is a combined separating and conducting tube 4 formed of a pair of sections and provided in proximity to its upper end with sets of circumferentially extending gas outlet ports 5, and said tube 4, in proximity to its lower end is formed with sets of circumferentially extending combined gas and oil inlets 6. The tube 4 depends an appropriate distance below the tube 3, has its lower end closed, and the sections thereof secured together by a removable bushing 21 to be presently referred to.

Surrounding the tube 4, as well as spaced therefrom, is a combined gas and oil separating tube 7. The tube 7 is of less length than the tube 4 and has its upper end positioned a substantial distance below the upper end of the tube 4 and its lower end positioned a substantial distance above the lower end of the tube 4, and said tube has the lower terminal portion 8 thereof secured to the bushing 21. The tube 7, in proximity to its upper end, is formed with circumferentially extending sets of gas outlets 9 which align with circumferentially extending sets of gas outlets 10 formed in the tube 4. The lower terminal portion 8 of the tube 7, in connection with the tube 4 and bushing 21 provides a sand trap 11. The tube 7, intermediate its end is formed with sets of circumferentially extending oil and gas inlet ports 12.

Surrounding the tube 7 and of slightly greater length than the length of the latter is an oil and gas separating tube 13, which is spaced from the tube 7. The upper end of the tube 13 is flush with the upper end of the tube 7, and the lower end of the tube 13 is positioned slightly below the lower end of the tube 7. The lower end terminal portion 14 of the tube 13 is secured to the bushing 21 and forms in connection with the latter and the tube 7 a sand trap 15. The tube 13, intermediate its ends is formed with sets of circumferentially extending oil and gas inlet ports 16, and near its upper end with sets of circumferentially extending gas outlet ports 17.

Slidably mounted on the tube 4 is a shiftable closure 18' for the upper ends of the tubes 7 and 13.

The bushing 21 is in the form of an annulus with its inner face threaded throughout for engagement with the threads 22 on the sections of the tube 4 to couple said sections together. The body of the bushing 21 is formed with a groove 22, opening at the upper face thereof and having one wall thereof threaded for engagement with the peripheral threads 23 on the tube 7 to secure the latter to the bushing. The other wall 24 of the groove 22 is bevelled to facilitate the discharge of sand from the groove when the bushing is upturned and further to prevent the sand from packing to an extent to interfere with the disconnection of the bushing from the tubes when desired. The outer face of the bushing 21 is peripherally threaded throughout as at 25 for engagement with the threads 26 on the inner face at the lower end of the tube 13.

The tube 3, in connection with the tube 4, provides a passage 18 for gas and oil. The tube 4, in connection with the tube 7, provides a passage 19 for oil, gas and sand, and the tube 7 in connection with the tube 13 provides a passage 20 for oil, gas and sand. The sets of inlet ports 6 in the tube 4 are arranged below the sets of inlet ports 12 in the tube 7, and the said sets of ports 12 in the tube 7 are arranged below the sets of inlet ports 6 in the tube 13. The outlet ports in the tubes 4, 7 and 13 are arranged in alignment with each other. The ports 5 are positioned above the closure 18'. The tubes 4, 7 and 13 are connected together in any suitable manner so as to maintain them in spaced relation.

The tubes 4, 7 and 13 provide for what may be termed three separating steps, as the oil, gas and sand enter first the ports 16 and first passes downwardly in the passage 20. The sand falls into the trap 15, a portion of the gas passes up the passage 20 and is discharged through the ports 17 and the gas and oil and a portion of the sand will pass through the ports 12 into the passage 18 and the sand falls into the trap 8, a portion of the gas passing upwardly and discharged through the ports 9 and the oil and a part of the gas passing through the ports 6 into the passage 18, and the gas will then pass upwardly and be discharged through the ports 5 and 10, the oil falling downwardly in the passage 18 and then will be drawn up through the conducting tube 3. The travel of the oil is indicated by the arrows A and C, and travel of the gas is indicated by the arrows B.

If the pressure of the gas when travelling for discharge becomes very heavy it will force the closure 18' upwardly so that discharge can be had from the upper open ends of the passages 19 and 20.

The closure 18' acts as a safety vent when the pressure of gas piles up within the device, and owing to the fact that the closure 18 can be shifted away from the tubes 7 and 13 the upper ends of these latter will be open to provide for discharge of the gas to relieve the pressure in the device.

The device as constructed provides for three successive gas and oil separating steps or drops to work the gas out of the oil, and two successive trapping or dropping steps for working the sand out of the gas and oil, and in view of which the gas and sand are separated from the oil before the latter enters the lower end of the oil conducting tube 3 through which it is withdrawn by the pumping action, and therefore, it is thought the many advantages of a combined separator and trap in accordance with this invention and for the purpose set forth, can be readily understood, and although the preferred embodiment of the invention is as illustrated and described, yet it is to be understood that changes in the details of construction can be had which will fall within the scope of the invention as claimed.

What we claim is:—

1. A combined separator and trap for the purpose set forth comprising an oil conducting tube and adapted to open at its upper end into the working barrel of a pump, a pair of tubular elements concentrically arranged with respect to each other and adjacent said tube, a tubular member adapted to be suspended at its upper end from the working barrel of the pump and surrounding and spaced from said tube and further spaced from and surrounded by the inner one of said elements, said elements of less length than the length of said tube and member and in connection with said member providing a pair of combined oil, gas and sand passages, said member in connection with said tube providing a combined oil and gas passage communicating with the lower end of the tube, said tube of less length than the length of said member, means connected to the lower ends of the outer and inner elements and surrounding said member above its lower end to provide a pair of independent sand traps, said elements and said member provided with circumferentially extending sets of inlet ports for said passages and with circumferentially extending sets of gas outlets for said passages, and said tube having its lower end opening into and positioned above the lower end of said member.

2. A combined separator and trap for the purpose set forth comprising an oil conducting tube adapted to open at its upper end into the working barrel of a pump, a pair of tubular elements concentrically arranged with respect to each other and adjacent said tube, a tubular member adapted to be suspended at its upper end from the working barrel of the pump and surrounding and spaced from said tube and further spaced from and surrounded by the inner one of said elements, said elements of less length than the length of said tube and member and in connection with said member providing a pair of combined oil, gas and sand passages, said member in connection with said tube providing a combined oil and gas passage communicating with the lower end of the tube, said tube of less length than the length of said member and means connected to the lower ends of said inner and outer elements and surrounding said member above its lower end and further to said member to provide a pair of sand traps, said elements and said member provided with circumferentially extending sets of inlet ports for said passages and with circumferentially extending sets of gas outlets for said passages, said tube having its lower end opening into and positioned below the lower end of said member, and a shiftable closure slidably mounted on said member and normally seating on the upper ends of said elements.

3. A combined separator and trap for the purpose set forth comprising an oil conducting tube leading to the working barrel of a pump, a pair of tubular elements concentrically arranged with respect to each other and adjacent said tube, a tubular member surrounding and spaced from said tube and further spaced from and surrounded by the inner one of said elements, said elements in connection with said member providing a pair of combined oil, gas and sand passages, said member in connection with said tube providing a combined oil and gas passage communicating with the lower end of the tube, the outer of said elements connected at its bottom with the inner of said elements and the inner of said elements connected at its bottom with said member thereby providing a pair of sand traps, said elements and said member provided with circumferentially extending sets of inlet ports for said passages and with circumferentially extending sets of gas outlets for said passages, and said tube having its lower end opening into and positioned below the lower end of said member, and a shiftable closure slidably mounted on said member and normally seating on the upper ends of said elements, the inlet ports in said member arranged below the inlet ports in the inner of said elements and the inlet ports formed in said inner element arranged below the inlet ports in the outer element.

4. A combined separator and trap for the purpose set forth comprising an oil conducting tube leading to the working barrel of a pump, a pair of tubular elements concentrically arranged with respect to each other and adjacent said tube, a tubular member surrounding and spaced from said tube and further spaced from and surrounded by the inner one of said elements, said elements in connection with said member providing a pair of combined oil, gas and sand passages, said member in connection with said tube providing a combined oil and gas passage communicating with the lower end of the tube, the outer of said elements connected at its bottom with the inner of said elements and the inner of said elements connected at its bottom with said member thereby providing a pair of sand traps, said elements and said member provided with circumferentially extending sets of inlet ports for said passages and with circumferentially extending sets of gas outlets for said passages, said tube having its lower end opening into and positioned below the lower end of said member, a shiftable closure slidably mounted on said member and normally seating on the upper ends of said elements, the inlet ports in said member arranged below the inlet ports in the inner of said elements and the inlet ports formed in said inner element arranged below the inlet ports in the outer element, and said member provided with an additional set of gas outlet ports above said shiftable closure.

5. A combined separator and trap for the purpose set forth comprising an oil conducting tube communicating with and adapted to be connected to the working barrel of a pump, means surrounding said tube to provide an inner, an intermediate and an outer separating passage and a trap at the lower end of the intermediate and the outer passage, said tube communicating at its lower end with said inner passage above the bottom of the latter, said intermediate and outer passages of less length than said inner passage and said tube of less length than the inner passage, said means further provided with a group of sets of inlets for the outer passage, a group of sets of inlets arranged below the first mentioned group and leading from the outer passage to the intermediate passage, a group of sets of inlets arranged below the second mentioned group and leading from the intermediate passage to the inner passage, said means further provided with a group of sets of outlets for each of said outer and intermediate passages and with one group aligning with the other, and said means further provided with two groups of sets of outlets for the inner passage arranged one above the other and with the lower group aligning with the outlets for the outer and intermediate passages, the outlets for the outer and intermediate passages arranged at the upper end thereof.

6. A combined separator and trap for the purpose set forth comprising an oil conducting tube communicating with and adapted to be connected to the working barrel of a pump, means surrounding said tube to provide an inner, an intermediate and an outer separating passage and a trap at the lower end of the intermediate and the outer passage, said tube communicating at its lower end with said inner passage above the bottom of the latter, said intermediate and outer passages of less length than said inner passage and said tube of the same length as the inner passage, said means further provided with a group of sets of inlets for the outer passage, a group of sets of inlets arranged below the first mentioned group and leading from the outer passage to the intermediate passage, a set of inlets leading from the intermediate passage to the inner passage and arranged below the second mentioned group, said means further provided with a group of sets of outlets for each of said outer and intermediate passages and with the outlets for said passages aligning, said means further provided with two groups of sets of outlets for said inner passage and with one group arranged below the other and aligning with the outlets for the outer and intermediate passages, the outlets for said outer and intermediate passages arranged at the upper end thereof, and a shiftable closure for the upper ends of the outer and intermediate passages.

7. A combined separator and trap for the purpose set forth comprising an oil conducting tube adapted to open at its upper end into the working barrel of a pump, a pair of tubular elements concentrically arranged with respect to each other and adjacent to said tube, a tubular member adapted to be suspended at its upper end from the working barrel of the pump and surrounding and spaced from said tube and further spaced from and surrounded by the inner one of said elements, said tubular member provided with a set of outlets near its upper end, said elements of less length than the length of said tube and member and in connection with said member providing a pair of combined oil, gas and sand passages, said member in connection with said tube providing a combined oil and gas passage communicating with the lower end of the tube, means connected to the lower ends of the outer and inner elements and surrounding said tube above its lower end to provide a pair of independent sand traps, said elements and said member provided with circumferentially extending sets of inlet ports for said passages and further with circumferentially extending sets of gas outlets for said passages, and said tube having its lower end opening into and positioned above the lower end of said member.

In testimony whereof, we affix our signatures hereto.

VICTOR CHANCELLOR.
SEBASTIAN L. CALVERT.